United States Patent [19]

Graber

[11] Patent Number: 4,802,594

[45] Date of Patent: Feb. 7, 1989

[54] BICYCLE SUPPORT STAND

[75] Inventor: John W. Graber, Stoughton, Wis.

[73] Assignee: Graber Products, Inc., Madison, Wis.

[21] Appl. No.: 146,852

[22] Filed: Jan. 22, 1988

[51] Int. Cl.$^4$ ................................................ A47F 7/04
[52] U.S. Cl. .......................................... 211/20; 211/22
[58] Field of Search ...................... 211/17, 19, 20, 21, 211/22, 23, 24

[56] References Cited

U.S. PATENT DOCUMENTS

| | | | |
|---|---|---|---|
| 556,806 | 3/1896 | Chandler | 211/20 |
| 576,351 | 2/1897 | Penfield | 211/24 X |
| 595,891 | 12/1897 | Robertson | 211/24 X |
| 612,663 | 10/1898 | Haubs | 211/20 |

FOREIGN PATENT DOCUMENTS

| | | | |
|---|---|---|---|
| 438033 | 12/1911 | France | 211/21 |
| 6542 | of 1896 | United Kingdom | 211/21 |
| 115530 | 5/1918 | United Kingdom | 211/22 |
| 742025 | 12/1955 | United Kingdom | . |

Primary Examiner—Robert W. Gibson, Jr.
Attorney, Agent, or Firm—Vernon J. Pillote

[57] ABSTRACT

A bicycle support stand for supporting a bicycle by engagement with a wheel of the bicycle. The stand includes a base frame having cross frame members and longitudinal frame members extending between the cross frame members and spaced apart to receive a bicycle tire adjacent the lower side of the bicycle wheel. Crotch frames are attached to the base frame adjacent each end of the longitudinal frame members and extend upwardly therefrom and have U-shaped crotch portions spaced above the base frame and arranged to straddle a bicycle tire at locations spaced above the base frame.

6 Claims, 2 Drawing Sheets

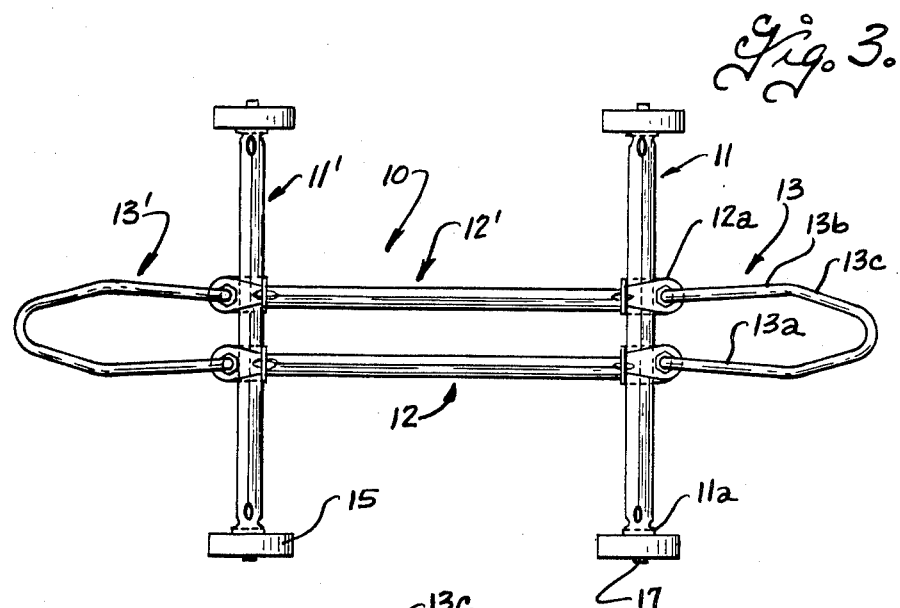
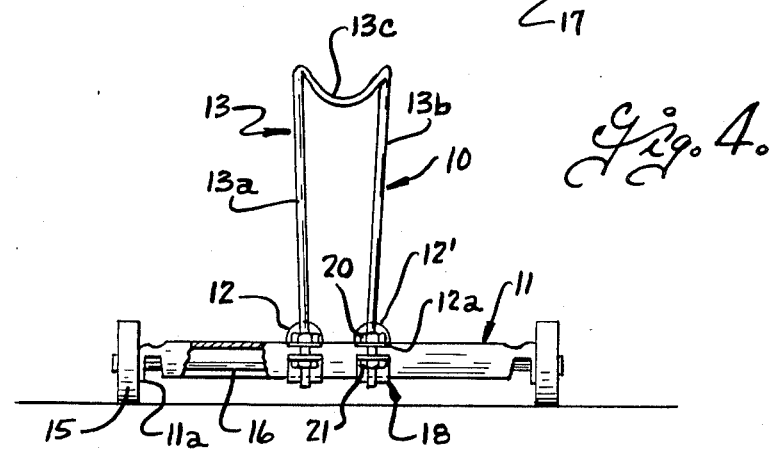
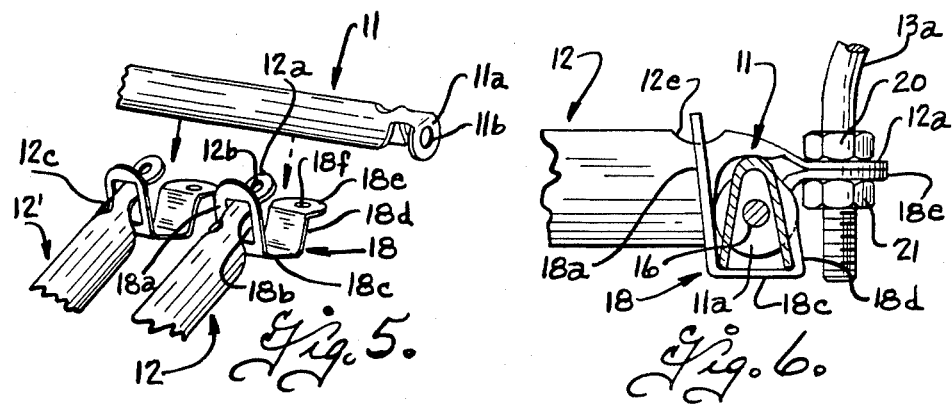

4,802,594

BICYCLE SUPPORT STAND

BACKGROUND OF THE INVENTION

The present invention relates to improvements in bicycle support stands of the type disclosed in U.K. Pat. No. 742,025, for supporting individual bicycles in an upright position by engagement with the wheel of the bicycle. Such bicycle support stands include a generally horizontal base frame having two elongated bars attached at their ends to cross frame members, with the bars extending between the cross frame members and spaced apart a distance to receive a tire at the lower portion of a bicycle wheel therebetween, and an arched member attached at opposite ends to the ends of each bar to extend upwardly therefrom in the plane of the bar for engagement with the bicycle wheel at a level above the bars. Bicycle stands of this type have also been made with rollers on the ends of the cross frame members, for supporting the stand and the bicycle thereon for movement along a path generally paralleling the elongated bars. Such bicycle support stands are not entirely satisfactory in that the arched members can engage and sometimes damage the wheel spokes. Moreover, the arched members can interfere with the derailleur gear of the bicycle.

SUMMARY OF THE INVENTION

It is an object of the present invention to provide a bicycle support stand for supporting a bicycle by engagement with a bicycle wheel, and which will not engage or damage the wheel spokes or interfere with the derailleur gear of the bicycle.

Another object of this invention is to provide a bicycle support stand in accordance with the foregoing object, and which can be economically and easily formed and assembled.

Accordingly, the present invention provides a bicycle support stand comprising a generally horizontal base frame including first and second cross frame members and first and second longitudinal frame members attached to the cross frame members and extending therebetween to straddle a bicycle tire adjacent the lower portion of the bicycle wheel, and first and second crotch frames attached to the base frame and extending upwardly respectively adjacent the first and second cross frame members. The crotch frames each include a pair of leg portions having lower ends attached to the base frame and a U-shaped crotch portion extending laterally from the pair of leg portions at a location spaced above the lower ends, the crotch portions of the first and second crotch frames being disposed in opposed relation to straddle a bicycle tire at first and second locations spaced from each other and from the longitudinal frame members.

BRIEF DESCRIPTION OF THE DRAWINGS

FIG. 3 is a plan view of the bicycle support stand taken on the plane 3—3 of FIG. 1;

FIG. 4 is an end elevational view of the bicycle support stand taken on the plane 4—4 of FIG. 1;

FIG. 5 is a fragmentary exploded view illustrating a step in the assembly of the bicycle support stand; and FIG. 6 is a fragmentary sectional view taken on the plane 6—6 of FIG. 4 and illustrating parts on a larger scale than FIG. 4.

DETAILED DESCRIPTION

Figure 1:
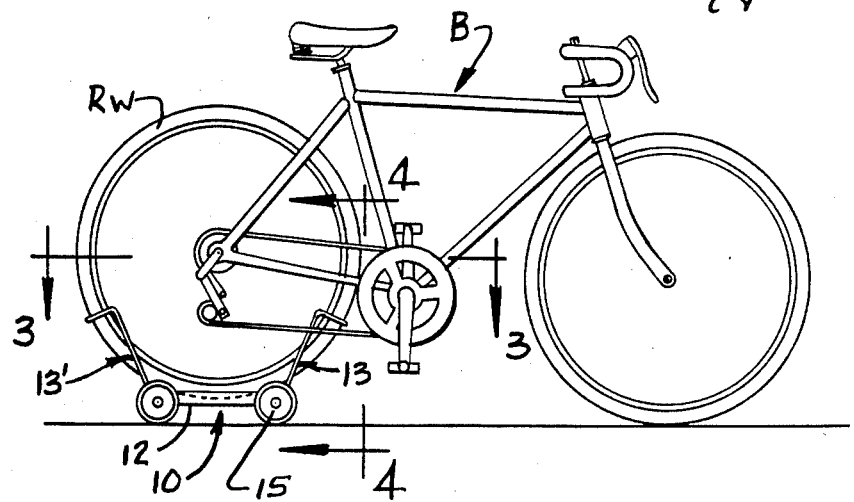
FIG. 1 is a side view illustrating the bicycle support stand of the present invention with a bicycle mounted on the stand.
Figure 2:
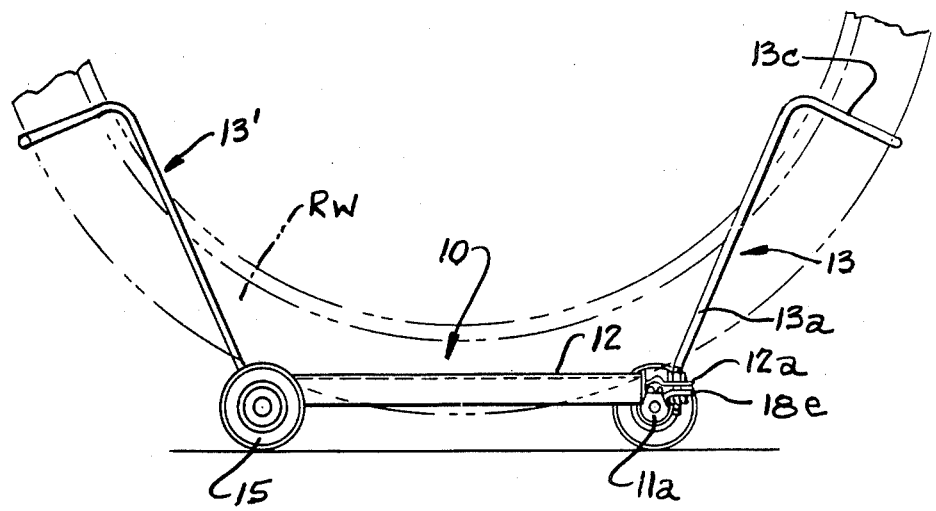
FIG. 2 is a side elevational view of the bicycle support stand with parts removed to illustrate details of construction.

The bicycle support stand 10 of the present invention is adapted to support a bicycle in an upright condition by engagement with a wheel of the bicycle and is shown in FIG. 1 with a bicycle B mounted with its rear wheel RW on the stand. The bicycle support stand includes a generally horizontal base frame including a pair of cross frame members 11 and 11' and longitudinal frame members 12 and 12' that are attached to and extend between the cross frame members. The size of the bicycle wheels and tires varies with different types of bicycles, for example from a bicycle wheel rim size of 20 inches on junior size bicycles to 27 inches on full size and racer type bicycles, and the tires also vary in balloon size from about 2.125 inches to 1.25 inches. The bicycle stand is arranged to accommodate a wide range of bicycle wheel diameters and tire sizes.

The longitudinal frame members 12 and 12' are arranged to straddle a bicycle tire adjacent the lower portion of the bicycle wheel and, in order to limit downward movement of the bicycle wheel between the longitudinal frame members, the length of the longitudinal frame members and hence the spacing between the cross members is made small as to compared to the diameter of the bicycle wheel, for example of a length not substantially greater than the radius of the bicycle wheel so that the longitudinal frame members extend generally secantially of the bicycle tire, when the bicycle tire rests on the cross frame members 11 and 11'. The longitudinal frame members may, for example, have a length so as to space the cross frame members apart a distance of about ten or eleven inches. As pointed out more fully hereinafter, the longitudinal frame members are mounted on the cross frame members for adjustment relative thereto to accommodate tires of different balloon size.

The longitudinal frame members 12 and 12' engage relatively opposite sides of the bicycles tire adjacent the bottom of the bicycle wheel and first and second crotch frames 13 and 13' are mounted on the base frame adjacent the first and second cross frame members and extend upwardly therefrom, to engage and support the bicycle wheel at first and second locations spaced above the longitudinal frame members. The crotch frame members are of like construction and each include first and second legs 13a and 13b that are attached at their lower ends to the ends of respective ones of the longitudinal frame members 12 and 12', and the legs extend upwardly from the longitudinal frame members and are interconnected at their upper ends by a U-shaped crotch portion 13c. The leg portions 13a and 13b are disposed in a plane that is inclined upwardly and outwardly relative to the longitudinal frame members 12 and 12' and the crotch portion 13c is disposed in a plane transverse to the plane through the leg portions. The crotch frames 13 and 13' are arranged with their crotch portions 13c in opposed relation to each other so as to straddle a bicycle tire at locations spaced above the longitudinal frame members and outwardly of the cross frame members. The crotch portions of the crotch frames are spaced above the longitudinal frame members a distance less than the radius of the bicycle wheel and are spaced apart a distance greater than the radius of the bicycle wheel but less than the wheel diameter to engage the wheel at locations below the level of the wheel axis. As best shown in FIGS. 3 and 4, the crotch portions 13c have a generally v-shaped configuration with a rounded apex to provide a wedge fit with tires of different balloon size. Since the leg portions of the crotch frames are attached to the ends of the longitudinal frame members, the spacing between the lower portions of the legs of the crotch frames is automatically adjusted when the longitudinal frame members are adjusted to accommodate tires of different size.

The bicycle stand with the crotch frames not only provides a laterally stable support for the bicycle when the bicycle wheel is mounted on the stand, but also inhibits relative movement between the bicycle wheel and the support stand in a direction paralleling the plane of the bicycle wheel. Rollers 15 are provided on the ends of the cross frame members for rotation about horizontal axes perpendicular to the longitudinal frame members, to facilitate movement of the bicycle to different positions when it is mounted in the stand.

The cross frames 11 and 11' are advantageously of like construction and are conveniently formed of strip sheet metal stock. As best shown in FIG. 6, the cross frame members 11 have an inverted v-shaped cross section with a rounded apex and ears 11a are formed on opposite ends of the cross frame members to extend transverse thereto with an opening 11b in the ears to receive an axle 16. The rollers 15 are rotatably mounted at opposite ends of the axle 16 and retained on the axle by any convenient means such as retainer caps 17.

The longitudinal frame members 12 and 12' are of like construction and are also conveniently formed of strip sheet metal stock with an inverted Y-shaped cross sectional configuration and with integral ears 12a extending from opposite ends and adapted to overlie a respective one of the cross frame members. The longitudinal frame members may advantageously be of the same size and configuration as the cross frame members, except that the ears 11a on the cross frame members are formed to extend perpendicular to the length of the cross frame members while the ears 12a on the longitudinal frame members are formed to extend generally longitudinally of the longitudinal frame members. The ears 12a are formed with an opening 12b therethrough for receiving the lower end of a leg portion of a crotch frame 13.

Generally U-shaped attaching brackets 18 are provided for adjustably clamping an end of each longitudinal frame member to an associated one of the cross frame members. As best shown in FIGS. 5 and 6, each U-shaped attaching bracket includes a first leg 18a having a generally rectangular opening 18b therethrough which is shaped to receive the end portion of one of the longitudinal frame members and slat in an opening or notch 12c in the top of the longitudinal frame members inwardly of the ears 12a. Each U-shaped attaching bracket also includes a web portion 18c adapted to underlie a cross frame member and a second leg 18d that extends upwardly at the side of the cross frame member opposite the leg 18a. The attaching bracket terminates in a laterally directed flange 18e having an opening 18f therethrough adapted to receive the lower end of one leg of a crotch frame. The crotch frames are formed of resilient wire, for example steel wire of No. 3 or 4 gauge AWG, and the lower end portions are threaded as shown in FIG. 6 with nuts 20 and 21 threaded on their lower ends respectively above the ear 12a on the longitudinal frame member and below the flange 18e on the attaching clamp, to clamp a cross frame member between the end portion of the longitudinal frame member and the attaching bracket. As is apparent, one of the nuts 21 can be loosened to release the clamping action and allow the longitudinal frame member to be adjusted longitudinally of the respective cross frame member.

From the foregoing it is believed that the construction and use of the bicycle support stand will be readily understood. The longitudinal frame members 12 and 12' are adapted to straddle the lower portion of a bicycle tire when it rests on the cross frame members and the crotch frames are arranged to engage the bicycle tire at locations spaced above the longitudinal frame members a distance not greater than the radius of the bicycle wheel. The crotch frames in conjunction with the longitudinal frame members not only provide a laterally stable support for the bicycle when the wheel is positioned on the stand, but also inhibit relative movement between the bicycle wheel and the stand in a direction paralleling the longitudinal frame members. Thus, the bicycle support stand will be retained in position on the bicycle wheel while supporting it in an upright condition, when the other wheel of the bicycle is lifted and the bicycle either pulled or pushed to move it and the stand to a different location. Since the lower ends of the legs of the crotch frames are attached to the ends of the longitudinal frame members, adjustment of the spacing between the longitudinal frame members to accommodate bicycle tires of different size, will also adjust the position and spacing of the legs of the crotch frames. The crotch frames are of resilient metal and can be bent so as to increase or decrease spacing between the yoke portions of the first and second yoke frames to accommodate wheels of widely different diameter. The longitudinal frame members engage the bicycle tire adjacent the lower side of the wheel and the yokes on the yoke frame engage the bicycle tire at locations spaced above the longitudinal frame members and outwardly from the hub of the wheel so that the bicycle stand does not engage or deform the spokes or interfere with the derailleur gear on the bicycle, when the bicycle is mounted in the stand.

The embodiments of the invention in which an exclusive property or privilege is claimed are defined as follows:

1. A bicycle support stand comprising, a generally horizontal base frame including first and second cross frame members and first and second longitudinal frame members, the longitudinal frame members each having a first end portion attached to the first cross frame member and a second end portion attached to the second cross frame member and extending in generally parallel spaced relation between the cross frame members to straddle a bicycle tire, a first crotch frame including first and second leg portions having lower ends attached to the first end portions of the first and second longitudinal frame members respectively, the first and second leg portions of the first crotch frame extending upwardly from the first end portions of the respective first and second longitudinal frame members and having upper ends connected by a first U-shaped crotch portion extending transverse to the associated leg portions, a second crotch frame including first and second leg portions having lower ends attached to the second end portions of the first and second longitudinal frame members respectively, the first and second leg portions of the second crotch frame extending upwardly from the second end portions of a respective first and second longitudinal frame members and having upper ends connected by a second U-shaped crotch portion extending transverse to the associated leg portions, the first and second crotch portions having open sides in opposed relation to straddle a bicycle tire at first and second locations spaced from each other and from the longitudinal frame members, the first and second longitudinal frame members being attached to the cross frame members for adjustment relative to each other to accommodate bicycle tires of different size.

2. A bicycle support stand comprising, a generally horizontal base frame including first and second cross frame members and first and second longitudinal frame members, the longitudinal frame members each having a first end portion attached to the second cross frame member and extending in generally parallel spaced relation between the cross frame members to straddle a bicycle tire, a first crotch frame including first and second leg portions having lower ends attached to the first end portions of the first and second longitudinal frame members respectively, the first and second leg portions of the first crotch frame extending upwardly from the first end portions of the respective first and second longitudinal frame members and having upper ends connected by a first U-shaped crotch portion extending transverse to the associated leg portions, a second crotch frame including first and second leg portions having lower ends attached to the second end portions of the first and second longitudinal frame members respectively, the first and second leg portions of the second crotch frame extending upwardly from the second end portions of a respective first and second crotch portions having open sides in opposed relation to straddle a bicycle tire at first and second locations spaced from each other and from the longitudinal frame members, said first end portions of the first and second longitudinal frame members overlying the first cross frame member and each have an upwardly facing opening therethrough, the second end portions of the first and second longitudinal frame member overlying the second cross frame member and each have an upwardly facing opening therethrough, a U-shaped attaching bracket individual to each end of each longitudinal frame member, each U-shaped attaching bracket having one leg shaped to engage a respective one of the end portions inwardly of the end thereof and a web portion shaped to underlie a respective one of the cross frame members and a second leg terminating in flange having an opening below the upwardly facing opening in a respective one of the end portions, the leg portions on the crotch frames extending through the opening in a respective one of the end portions of the longitudinal frame members and through the opening in the second leg of the associated attaching bracket.

3. A bicycle support stand according to claim 2 wherein the crotch frames are formed of resilient wire and the lower ends of the leg portions are threaded, and nuts on the threaded lower ends of the leg portion for clamping the attaching bracket and the end of the longitudinal frame member to the associated cross frame member.

4. A bicycle support stand according to claim 3 wherein the leg portions of the first crotch frame and the leg portions of the second crotch frame are respectively disposed in first and second planes that diverge upwardly relatively to each other.

5. A bicycle support stand according to claim 4 including rollers on the ends of each of the cross frame members for supporting the base frame.

6. A bicycle support stand according to claim 2 wherein the first and second longitudinal members are attached to the cross frame members for adjustment relative to each other to accommodate bicycle tires of different size.

* * * * *

United States Patent [19]

Northington

[11] Patent Number: 4,802,595

[45] Date of Patent: Feb. 7, 1989

[54] DEBRIS RECEIVING TROUGH

[76] Inventor: Bengie Northington, 14643 Almanac Dr., Burtonsville, Md. 20866

[21] Appl. No.: 93,224

[22] Filed: Sep. 4, 1987

[51] Int. Cl.4 ............................................. A47F 5/00
[52] U.S. Cl. ...................................... 211/88; 211/175; 108/26
[58] Field of Search .................. 211/88, 86, 175, 126; 108/25, 26, 28; 312/229, 231

[56] References Cited

U.S. PATENT DOCUMENTS

| 506,530 | 10/1893 | McGrady | 211/88 X |
| 581,681 | 4/1897 | Shauer | 211/88 |
| 2,600,096 | 6/1952 | Cooper et al. | 211/175 X |
| 2,637,918 | 5/1953 | Mayhew | 108/26 X |
| 2,770,513 | 11/1956 | Brown | 108/27 UX |
| 4,099,470 | 7/1978 | Cannon | 108/26 |
| 4,155,310 | 5/1979 | Gregory | 108/26 |
| 4,250,396 | 2/1981 | Moeller | 312/231 X |
| 4,716,840 | 1/1988 | Tringali et al. | 108/27 |

Primary Examiner—Robert W. Gibson, Jr.
Attorney, Agent, or Firm—Frank L. Abbott

[57] ABSTRACT

A trough for attachment to the edge of a draftsman's table to receive debris such as that generated by erasures, etc. The trough is adjustable in length, supported by brackets and readily removable from the brackets so the debris may be emptied into a waste receptacle.

8 Claims, 3 Drawing Sheets

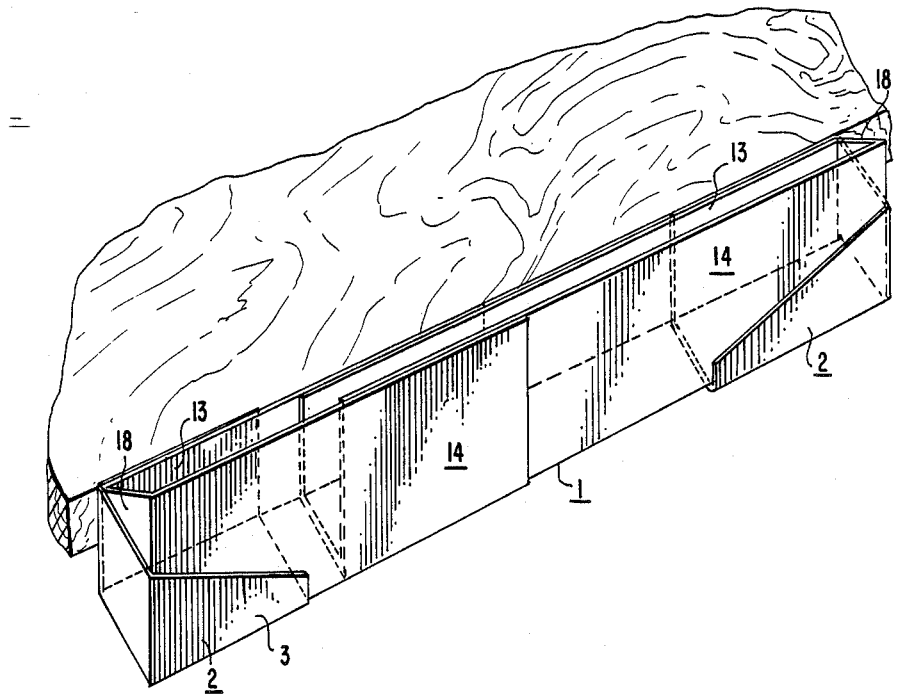

UNITED STATES PATENT AND TRADEMARK OFFICE
CERTIFICATE OF CORRECTION

PATENT NO. : 4,802,594
DATED : Feb. 7, 1989
INVENTOR(S) : John W. Graber

It is certified that error appears in the above-identified patent and that said Letters Patent is hereby corrected as shown below:

Column 5, line 16, after the word "the" insert -- first cross frame member and a second end portion attached to the --;

, Line 33, after the word "second" insert -- longitudinal frame members and having upper ends connected by a second U-shaped crotch portion extending transverse to the associated leg portions, the first and second -- .

Signed and Sealed this

Thirteenth Day of June, 1989

Attest:

DONALD J. QUIGG

Attesting Officer

Commissioner of Patents and Trademarks